United States Patent

Minakata

[19]

[11] Patent Number: 5,805,168
[45] Date of Patent: *Sep. 8, 1998

[54] APPARATUS AND METHOD FOR CONVERTING LINE SEGMENT DATA TO THREE-DIMENSIONAL DATA

[75] Inventor: Hiroshi Minakata, Tokyo, Japan

[73] Assignee: International Business Machines Corporation, Armonk, N.Y.

[*] Notice: The term of this patent shall not extend beyond the expiration date of Pat. No. 5,649,080.

[21] Appl. No.: 787,555

[22] Filed: Jan. 22, 1997

Related U.S. Application Data

[62] Division of Ser. No. 476,291, Jun. 7, 1995, Pat. No. 5,649,080, which is a continuation of Ser. No. 67,772, May 26, 1993, abandoned.

[30] Foreign Application Priority Data

Jun. 5, 1992 [JP] Japan .................................. 4-169997

[51] Int. Cl.⁶ .................................................. G06T 11/80
[52] U.S. Cl. ........................................... 345/427; 345/443
[58] Field of Search ..................................... 395/119, 127, 395/133, 143; 345/419, 427, 433, 443

[56] References Cited

U.S. PATENT DOCUMENTS 4,933,865  6/1990  Yamamoto et al. .................... 382/203
5,010,502  4/1991  Diebel et al. ........................... 395/119
5,129,054  7/1992  Alstad et al. ........................ 395/119 X
5,237,647  8/1993  Roberts et al. ......................... 395/119
5,303,337  4/1994  Ishida ...................................... 395/119
5,649,080  7/1997  Minakata ................................ 395/127

Primary Examiner—Mark K. Zimmerman
Attorney, Agent, or Firm—Mark S. Walker

[57] ABSTRACT

An apparatus and method in which an operator can input a three-dimensional (3D) graphics to a graphic system by performing an operation that is as if he were sketching on a paper surface. A line segment of two-dimensional (2D) data is input through an input device such as a mouse, and is then temporarily stored in a storage device as well as being displayed on a 2D display screen. The line segment of 2D data is converted to 3D data when it obtains information in the depth direction based on its relationship to another line segment that constitutes a 3D graphics and has 3D data already. 3D data of line segments that have that data in addition to 2D data are stored in a storage device, and are projected by a projection conversion circuit onto a 2D projection plane that has been set by a visual field input device, so as to be converted to 2D data, which are then displayed on the display screen. Therefore, the line segments that have already been converted to 3D data are displayed on the display screen together with the line segments that have been input through the input device and still have only 2D data. An operator can construct a 3D graphics constituted of 3D line segments simply by inputting 2D line segments as if he were sketching.

2 Claims, 14 Drawing Sheets

APPARATUS AND METHOD FOR CONVERTING LINE SEGMENT DATA TO THREE-DIMENSIONAL DATA

This application is a division of U.S. Pat. No. 5,649,080 issued Jul. 15, 1997 based on application Ser. No. 08/476, 291 filed Jun. 7, 1995, which was a continuation of application Ser. No. 08/67,772, filed May 26, 1993, now abandoned.

BACKGROUND OF THE INVENTION

1. Field of the Invention

The present invention relates to an apparatus and method for converting two-dimensional (2D) line segment data that is input through a 2D input device such as a mouse or tablet to three-dimensional (3D) data to facilitate the construction of a 3D wireframe graphics. The invention further relates to an apparatus and method for displaying line segments of 2D data and line segments of 3D data in a mixed form on a 2D display device such as a CRT.

2. Description of the Related Art

Due to the absence of information in the depth direction, no currently available combination of a 2D input device and a 2D display device can provide direct graphic input of a 3D wireframe graphics to an apparatus.

For example, as shown in FIG. 17A, in the case of inputting a line segment GH as a 3D line segment with an endpoint G selected as the origin and displaying it on a 2D plane (in this case, the paper surface of the figure), the line segment GH can be specified as a 3D line segment having 3D data if the position of the other endpoint H is determined as 3D data. However, since the position of the endpoint H cannot be determined three-dimensionally due to the absence of information in the depth direction, the line segment GH cannot be specified three-dimensionally; that is, it may be the line segment shown in FIG. 17B or FIG. 17C, or one in another position. That is, a 3D graphics constructing apparatus cannot specify the 2D line segment GH as a 3D line segment by data processing.

When a designer sketches a 3D object on, for example, a paper surface using a writing instrument, he recognizes, using his own senses, the 3D position of a line segment like the above line segment GH (i.e., endpoint H) even if it has not been determined, and, as the sketch progresses, he establishes the position of a line segment that has not yet been specified three-dimensionally based on its relationship to later-drawn line segments. In this manner, he can draw a 3D object image consisting of line segments whose positions are three-dimensionally determined as a whole.

However, conventional data processing using a computer can produce a 3D wireframe graphics and display it on a 2D display screen only in the case where coordinate data for each of the line segments (i.e., its endpoints) that constitute the graphics are three-dimensionally specified. Therefore, a 3D graphics is input in a way such that the 3D coordinates of its vertices are directly input from a keyboard in the form of numerical values, or in a way such that using a three-plane diagram three views of the graphics are separately input in a graphic manner and thereafter corresponding points among the views are indicated by an operator.

In the former method, however, mistakes in order of magnitude are likely to occur. The latter method has the problem that error is likely to occur in indicating the corresponding points, and it is also cumbersome to draw a plurality of views of the same object as viewed from different directions.

There is known a method in which a 3D line segment to be drawn is input to an apparatus by inputting its coordinates along reference 3D coordinate axes (Agui et al., "Solid Object Input System by Conformal Projection Method," *Transactions of Information Processing Society of Japan*, January 1987, Vol. 28, No. 1). However, in this method, 3D coordinates are simply input in a graphic manner, and the line segment still cannot be drawn (i.e., displayed) without provision of all the 3D coordinates.

Another method is known in which the inputting is performed such that a plane is specified in a 3D space and made to have a one-to-one correspondence with coordinates of a 2D plane for the inputting (E. Sittas, "3D Design Reference Framework", *Computer-Aided Design,* 1991, pp. 380–384). However, this method is associated with the problem of a cumbersome input operation because a plane must be defined before each input of a line segment.

SUMMARY OF THE INVENTION

An object of the present invention is to provide an apparatus and method in which when a 3D graphics is input to a graphic device, it can be input and displayed in a way that the designer feels that it is easy to draw it, that is, feels as if he were sketching it on a paper surface.

More specifically, it is intended to display, in a mixed state, line segments having only 2D data together with line segments which also have 3D data on a display screen with a 2D coordinate system, and to enable the designer to proceed to input respective line segments to construct a 3D graphics while looking at the line segments being displayed, to thereby realize the figure drawing which suits the designer's sense.

Further, it is intended to enable, at any time, the rotation and enlargement or reduction of a graphics being drawn, to obtain the orientation suitable for ease in drawing, and to enable a designer to perform the input operation while properly recognizing the solid graphics that is being constructed.

In inputting a 3D object, it is desired to provide an interface that is as natural as sketching. According to the technique of the invention, in which the parallel projection method is employed, 3D line segments and curves can be input while they are recognized one by one visually and interactively using three orthogonal axes in space as clues. When it becomes difficult to continue the drawing of the object because of the existence of line segments being drawn too densely, the object can be rotated as desired to provide an orientation suitable for the drawing.

In order to attain the above objects, an apparatus of the present invention for performing conversion to 3D data comprises: a means for storing 2D line segment data; a means for storing a line segment of 3D data; a means for converting 3D line segment data to 2D data by projecting the 3D line segment data onto a 2D projection plane; and a means for converting said stored 2D line segment data to 3D data based on its relationship to a line segment that has 3D data and has been converted to 2D data.

More specifically, the apparatus of the invention further comprises: a display means having a display screen with a 2D coordinate system; an input means used for inputting 2D line segment data; a means for displaying a line segment of 2D data on said display screen; and a means for displaying on said display screen a line segment that has been converted to 2D data by projection conversion.

A method according to the invention for converting a line segment of 2D data to 3D data comprises the steps of:

converting 3D line segment data to 2D data by projecting the 3D line segment data onto a 2D projection plane; and converting new 2D line segment data to 3D data based on its relationship to a line segment that has 3D data and has been converted to 2D data.

More specifically, the method of the invention further comprises the steps of: storing 2D line segment data; displaying a line segment of 2D data on a display screen with a 2D coordinate system; displaying on said display screen a line segment that has been converted to 2D data by projection conversion; and storing line segment data that has been converted to 3D data.

In order to attain the above objects, a display device of the invention comprises: a display means having a display screen with a 2D coordinate system; a projection conversion means for converting 3D line segment data to 2D data by projecting the 3D line segment data onto a 2D projection plane; a means for displaying on said display screen a line segment that has been converted to 2D data by the projection conversion means; and a means for displaying on said display screen a line segment that has been input as 2D data.

A display method of the invention comprises the steps of: converting 3D line segment data to 2D data by projecting the 3D line segment data onto a 2D projection plane; displaying on a display screen with a 2D coordinate system a line segment that has been converted to 2D data by projection conversion; and displaying the new line segment of 2D data on said display screen.

According to the invention as summarized above, a designer can draw a 3D graphics while inputting 2D line segment data and while recognizing them as 3D line segments visually and interactively.

When the position in three dimensions of an input line segment of 2D data is not determined and therefore it cannot be converted to 3D data, the input line segment is left as it is and is afterwards automatically converted to 3D data upon determination of its position in three dimensions based on its relationship to a newly added line segment. That is, the system according to the invention edits a wireframe 3D graphics while displaying, in a mixed state, line segments of 2D data, until they are converted to 3D data, together with other line segments which have 3D data.

If a means or a step that is capable of arbitrarily setting the 2D projection plane to be used for projection-converting 3D line segment data to 2D data is further provided in the invention as summarized above, line segments that have been specified three-dimensionally can be displayed on the 2D display screen with an arbitrary orientation and size.

DESCRIPTION OF THE PREFERRED EMBODIMENT

An embodiment of the present invention is hereinafter described in detail with reference to the accompanying drawings.

Figure 1:
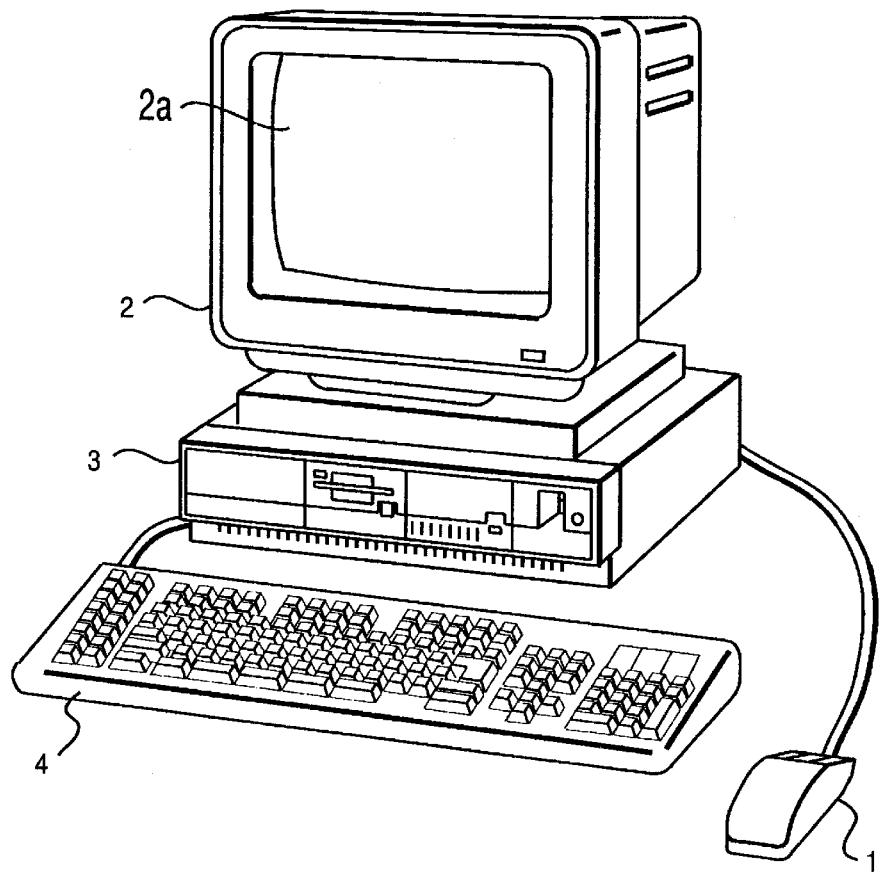
FIG. 1 is a view of an appearance of an apparatus for performing conversion to 3D data.

As shown in FIG. 1, an apparatus according to an embodiment for performing conversion to 3D data is constituted of a mouse 1 as a 2D input means, a CRT display 2 as a display means, a personal computer 3 for performing various data processing operations, and a keyboard 4 as an auxiliary input means.

Figure 2:
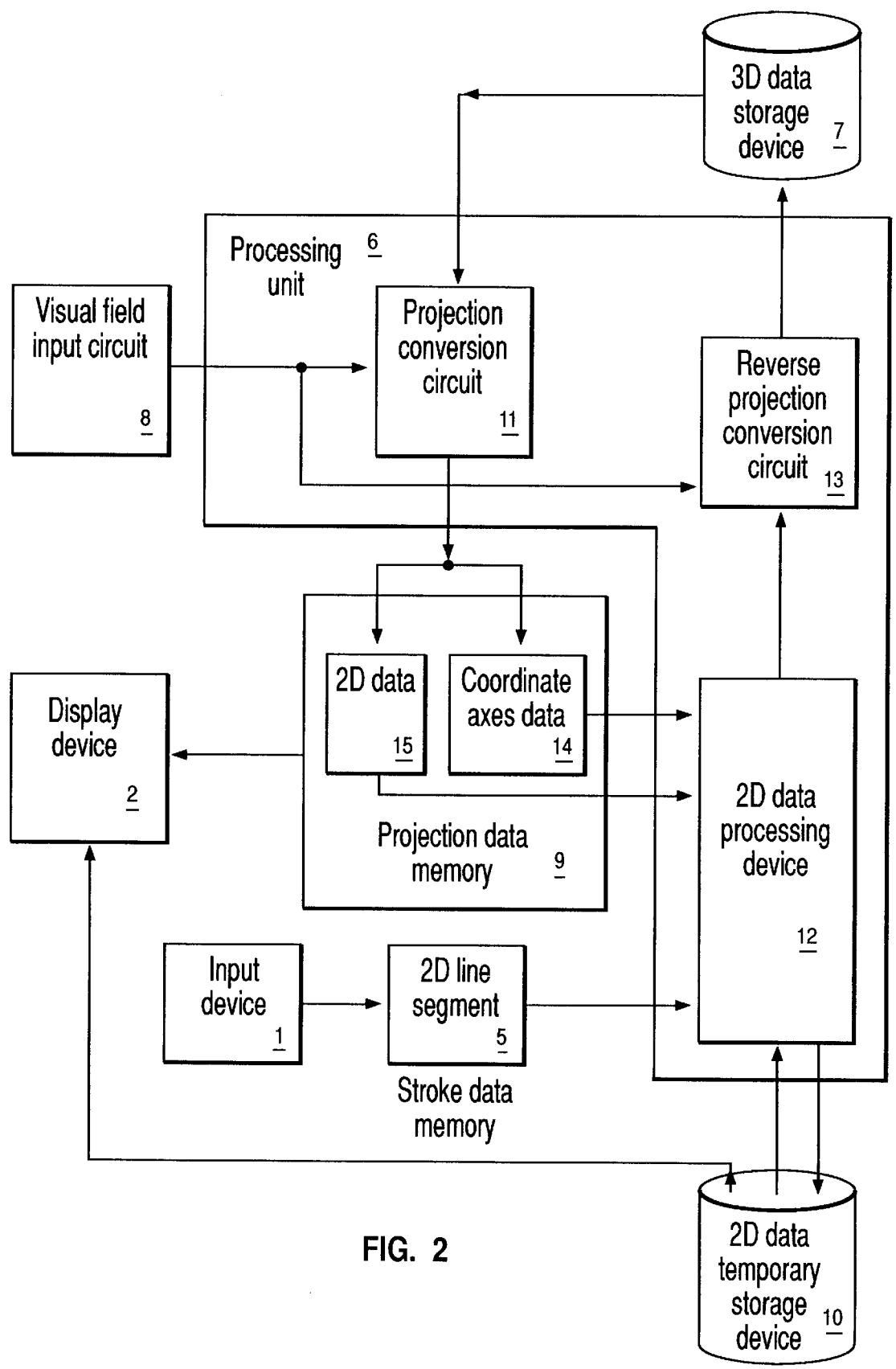
FIG. 2 is a block diagram showing a functional configuration of the apparatus for performing conversion to 3D data.

FIG. 2 shows an internal configuration of the above conversion apparatus, which mainly consists of the following components: a stroke data memory 5 which stores stroke data (i.e., the 2D data of a line segment) that is input through the mouse 1; a processing unit 6 which is described later; a 3D data storage device 7 which stores 3D line segment data that is determined by the processing unit 6; a projection data memory 9 which stores 2D coordinates that are obtained by a projection conversion circuit 11 which performs parallel projection of the above 3D data; a 2D data storage device 10 which temporarily stores 2D data (stroke data) that has not yet been converted to 3D data; a display device 2 which displays respective line segments on its display screen 2a with a 2D coordinate system based on data provided from the projection data memory 9 and the 2D data storage device 10.

The processing unit 6 consists of a projection conversion circuit 11 for converting the 3D data of a line segment stored in the 3D data storage device 7 to 2D data by parallel projection, a 2D data processing device 12 for examining the relationship between the 2D data of a line segment after it is subjected to the projection conversion and the stroke data of a newly input line segment, and a reverse projection conversion circuit 13 for converting the 2D data of a line segment to 3D data.

A visual field input device 8 inputs various parameters for defining the 2D projection plane for the projection conversion circuit 11. Based on these parameters, the 2D projection plane, which is used as a reference when the projection conversion circuit 11 converts 3D data to 2D data by parallel projection, is set arbitrarily. In this embodiment, the visual field input device 8 is constituted of the mouse 1.

The projection data memory 9 consists of a memory 14 for storing the directions of 3D coordinate axes as converted to 2D data by the projection conversion circuit 11, and a memory 15 for storing the projection coordinates of a 3D line segment as converted to 2D data by the projection conversion circuit 11. That is, the projection data memory 9 stores 2D coordinates that are obtained by parallel-projecting 3D coordinates onto the 2D projection plane that is set by the visual field input device 8.

Line segments that are read out from the projection data memory 9 and displayed on the display screen 2a of the display device 2 form an image as viewed in the visual field of the 2D projection plane that is set by the visual field input device 8. On the other hand, line segments that are read out from the 2D data temporary storage device 10 and displayed on the display screen 2a of the display device 2 are based only on the 2D data that is input through the input device 1 by an operator who recognizes the display screen 2a as a reference 2D plane. That is to say, the latter line segments form an image as drawn on the 2D display screen 2a.

Figure 3:
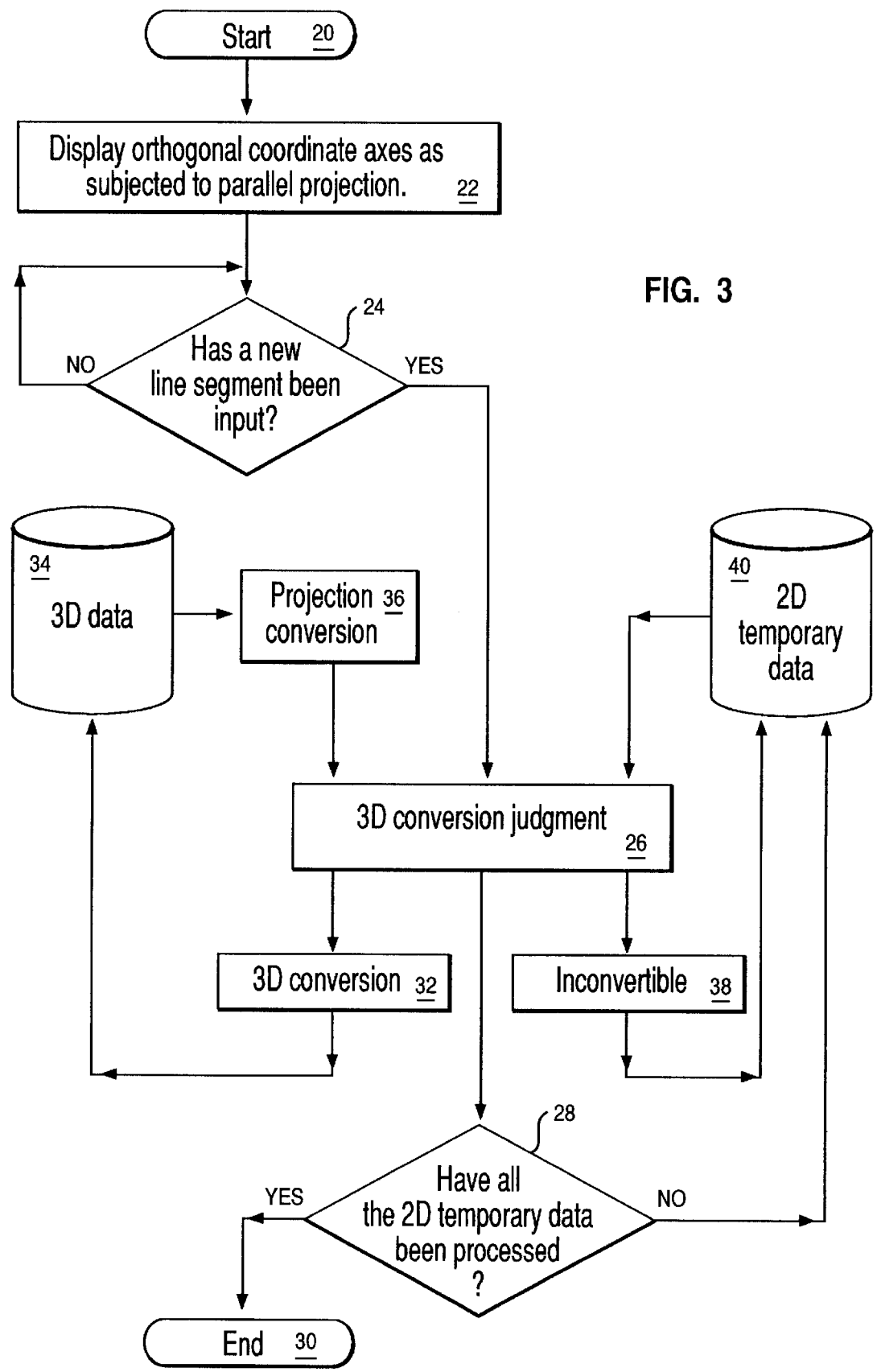
FIG. 3 is a flowchart of a process for performing conversion to 3D data.

Referring to FIG. 3, the operation of processing input data (i.e., stroke data of a line segment) is described, which operation is mainly performed by the 2D data processing device 12.

Figure 6:
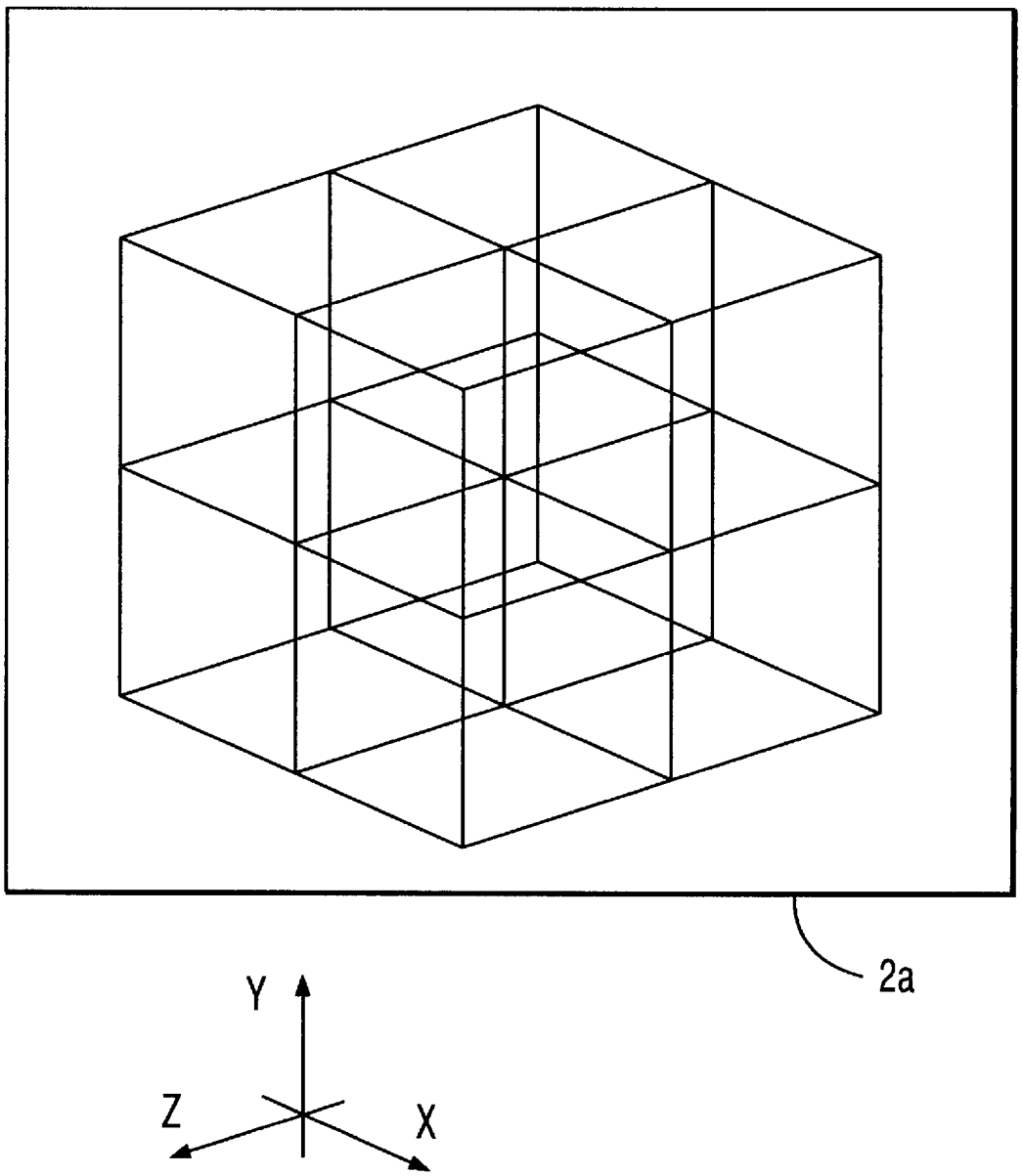

After performing various initial settings (step 20), 3D orthogonal coordinate axes as parallel-projected onto the 2D projection plane that has been set by the visual field input device 8 appear in an initial input screen of the display device 2 (step 22). For example, as shown in FIG. 6, fundamental cubes, which are drawn on the basis of the parallel-projected 3D orthogonal coordinate axes, are displayed to facilitate the recognition of spatial position.

When an arbitrary line segment is input as stroke data in the initial input screen using an input device 1 such as a mouse (step 24), it is judged whether this newly input line segment is convertible to 3D data (step 26).

The 2D data processing device 12 judges whether the newly input line segment is convertible to 3D data (step 26) using, as a clue, a line segment that has been obtained by converting, to 2D data, the line segment data being stored in the 3D data storage device 7 as 3D data (step 36). That is, it is judged whether information in the depth direction can be obtained with respect to the newly input line segment having only 2D data (i.e., having no information in the depth direction, which is necessary to determine its position in terms of 3D coordinates) based on another line segment that has already been specified as 3D data, as described later with reference to FIG. 4.

A line segment which has been judged to be convertible to 3D data is converted by the reverse projection conversion circuit 13 to 3D data (step 32), which is then stored into the 3D data storage device 7 (step 34).

On the other hand, a line segment which has been judged to be inconvertible to 3D data (step 38) is temporarily stored in the 2D data temporary storage device 10 until it becomes convertible to 3D data based on a later input line segment which gives information in the depth direction to the temporarily stored line segment (step 40).

As described above, among the line segments that are input through the input device 1, line segments convertible to 3D data are stored after conversion to 3D data, and line segments inconvertible to 3D data are stored as the original 2D data. All the data thus stored in the data storage device 10 as original 2D data are subjected to judgment as to their convertibility to 3D data every time a new line segment is input (step 28).

With the series of operations for performing conversion to 3D data as described above, as shown in FIG. 2, the line segments that are stored in the projection data memory 9 after being read out from the 3D data storage device 7 and converted to 2D data by the projection conversion circuit 11, and the line segments that are stored in the 2D data temporary storage device 10 and still associated only with 2D data, are input to the display device 2 and displayed on the display screen 2a with a 2D coordinate system such that the two kinds of line segments are mixed with each other.

In displaying these line segments, if the line segments having only temporary 2D data and those having 3D data are displayed using different colors, the operator can easily recognize the state of the 3D graphics being constructed, which will facilitate his input operation.

Figure 4:
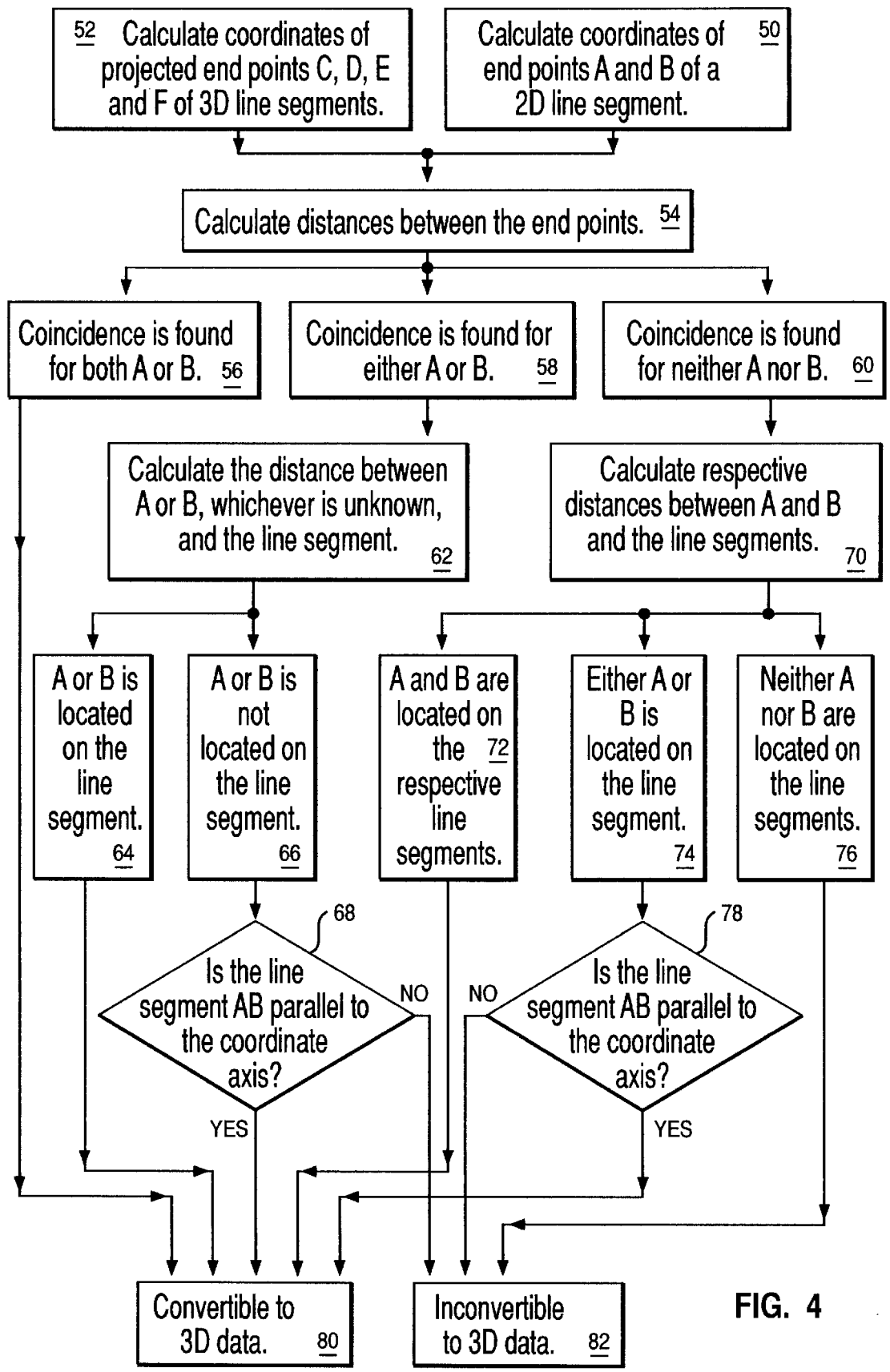
FIG. 4 is an another flowchart of the process for performing conversion to 3D data.

The judgment on the convertibility to 3D data (step 26) is described below in more detail with reference to the flowchart of FIG. 4 and the schematic diagram of FIG. 5.

The judgment of whether a line segment AB that was input as stroke data and still has only 2D data is convertible to 3D data by adding information in the depth direction based on its relationship to line segments CD and EF that have been input before or after the line AB and that have been specified three-dimensionally and projection-converted to 2D data for their display on the display device 2 is performed in the following manner. First, the 2D coordinates of the endpoints A and B of the line segment AB (step 50) and, at the same time, the 2D coordinates of the endpoints C, D, E and F of the line segments CD and EF are calculated (step 52).

Then, each of the distances between the endpoints A and B and the endpoints C, D, E and F are calculated (step 54), and based on the distances thus calculated the relationship between the line segments is judged. That is, if the distance is equal to zero or within a threshold value that can be regarded as zero based on a precision that can be set arbitrarily, the endpoints can be judged to be identical points. If the distance is larger than the threshold value, the endpoints are judged to be not identical.

Figure 5A:
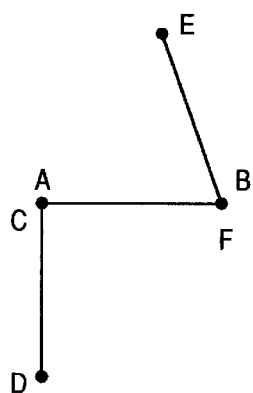
FIGS. 5A–5C are schematic diagrams illustrating relationships between line segments.

As shown in FIG. 5A, if the distance between the endpoint A of the line segment AB and the endpoint C of the line segment CD is within the threshold value, which means the endpoints A and C are identical, and if the endpoint B and the endpoint F of the line segment EF are within the threshold value, which means the endpoints B and F are identical (step 56), information in the depth direction can be added to each of the endpoints A and B based on the data of the endpoints C and F that have been specified in three dimensions. Therefore, the line segment AB is convertible to 3D data by the reverse projection conversion circuit 13 (step 80).

Figure 5B:
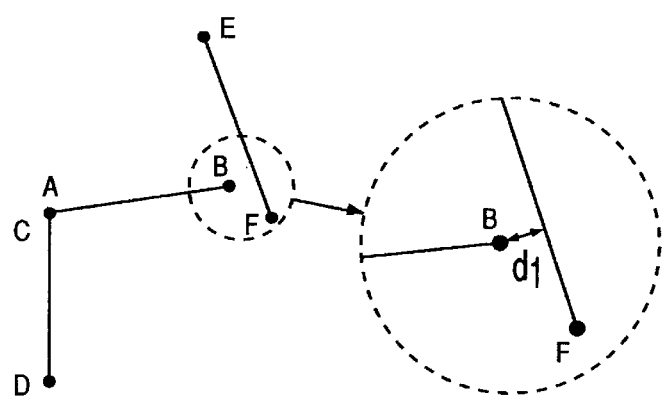

On the other hand, as shown in FIG. 5B, if only one endpoint of the line segment AB is identical to one endpoint of the line segments CD or EF (the endpoint A coincides with the endpoint C in FIG. 5B; step 58), the distance d1 between the other endpoint B of the line segment AB and the other line segment EF is calculated (step 62). Then, it is judged whether the distance d1 is within the above-mentioned threshold value. If the judgment is affirmative, the endpoint B is judged to be located on the line segment EF (step 64). Therefore, information in the depth direction can be added to the endpoint B based on the data for the line segment EF, which has been specified three-dimensionally, to determine its position in three dimensions. It is concluded that the line segment AB, whose endpoints A and B can be specified three-dimensionally, is convertible to 3D data (step 80).

In contrast to the above case, if the distance d1 is larger than the threshold value, it is judged that the endpoint B is not located on the line segment EF (step 66). In this case, it is further judged whether the line segment AB is parallel to one of the 3D coordinate axes that are stored in the coordinate axes data memory 14 after being converted to 2D data (step 68). An arbitrary line segment that is parallel to one of the 3D coordinate axes can be specified three-dimensionally if the position in three dimensions of one of its endpoints is determined. Therefore, if the line segment AB is parallel to one of the 3D coordinate axes, it is judged that the 2D data of the line segment AB is convertible to 3D data (step 80). If the line segment is not parallel to one of the 3D coordinate axes, the 2D data of the line segment AB is judged to be inconvertible to 3D data (step 82), and is therefore stored in the 2D data temporary storage device 10 without conversion.

Figure 5C:
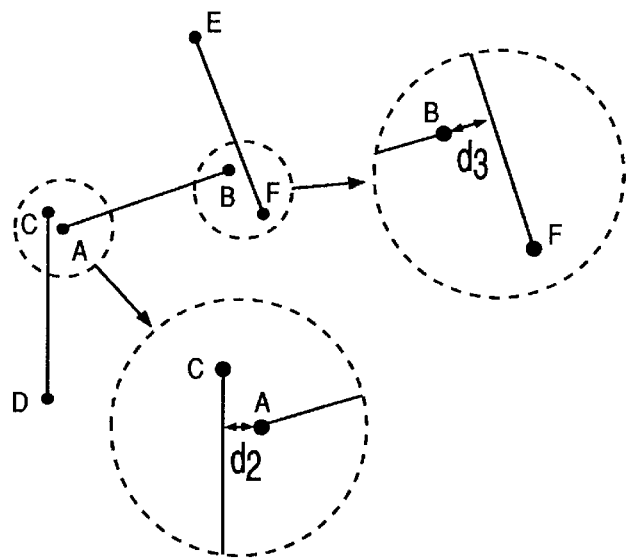

Furthermore, as shown in FIG. 5C, if neither of the endpoints of the line segment AB are identical to the endpoints of the line segments CD and EF (step 60), the distance d2 between the endpoint A of the line segment AB and the line segment CD and the distance d3 between the endpoint B and the line segment EF are calculated (step 70).

Then, it is judged whether each of the distances d2 and d3 is within the threshold value. If both distances are within the threshold value, it is judged that the endpoints A and B are located on the line segments CD and EF, respectively (step 72). It is concluded that the line segment AB is convertible to 3D data (step 80).

On the other hand, if only one of the distances d2 and d3 is within the threshold value, one of the endpoints A and B is judged to be located on the line segment CD or EF (step 74). In the same manner as in the above case in which only one of the endpoints A and B is specified in three dimensions, it is judged whether the line segment AB is parallel to one of the 3D coordinate axes (step 78). If the judgment is affirmative, the line segment AB is judged to be convertible to 3D data (step 80). If the judgment is negative, the line segment is judged to be inconvertible to 3D data (step 82), and is therefore stored in the 2D data temporary storage device 10 without conversion. Furthermore, if neither of the distances d2 and d3 are within the threshold value, it is judged that neither of the endpoints A and B are located on the line segments CD and EF, respectively (step 76). Since no information in the depth direction is added to the line segment AB from the data of the line segments CD and EF, the line segment AB is judged to be inconvertible to 3D data (step 82), and is therefore stored into the 2D data temporary storage device 10 without conversion.

Now, based on an example shown in FIGS. 6–16, it is described how the 3D graphics of an airplane is constructed and displayed on the 2D display screen 2a of the display device 2. In FIGS. 6–16, line segments that have been specified three-dimensionally are drawn by solid lines, and those not yet specified three-dimensionally, i.e., having only 2D data, are drawn by dotted lines.

As shown in FIG. 6, in the initial state, the 3D coordinate axes as converted to 2D data are displayed on the 2D display screen 2a. In this example, the angles formed by the axes are drawn as deviating from 90° to properly display the axes three-dimensionally, and cubes having the axes as their edges are displayed to facilitate the recognition of the axes by an operator. Furthermore, for convenience in description, the X-, Y- and Z-axes are defined as shown in FIG. 6.

Figure 7:
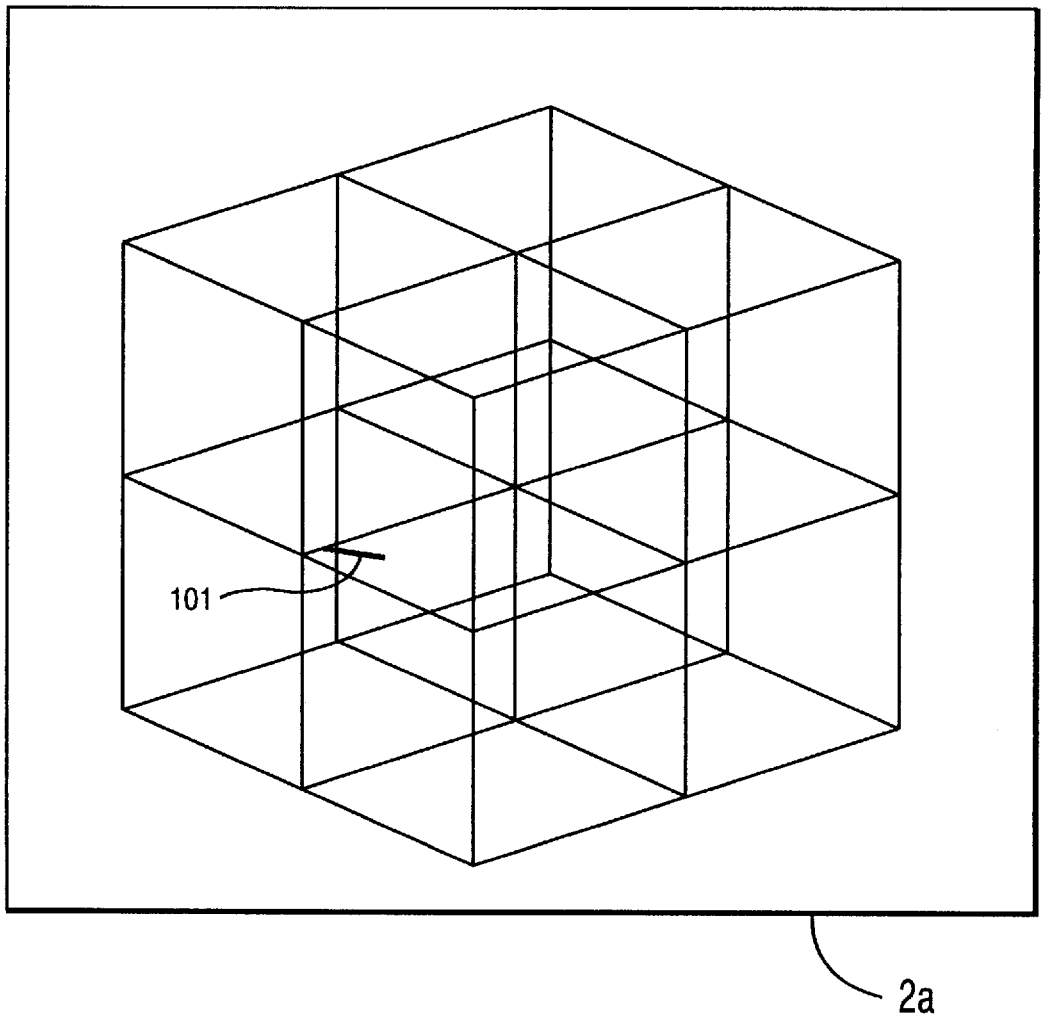

When a line segment 101 representing the left-side edge of the nose portion of the airplane is stroke-input using the mouse 1, it is displayed on the 2D screen 2a as shown in FIG. 7. The first-input line segment 101 is entirely 2D data, and its position in three dimensions is not determined yet. In this example, the first-input line segment 101 is implicitly defined as located in the plane of y=0 by an input from the mouse 1 or keyboard 4, to make it a basis for the drawing. If the 3D basis for the drawing is defined in the initial stage in this manner, line segments that are stroke-input thereafter can be specified three-dimensionally based on their relationship to the basis thus defined. However, in the invention, it is not always necessary to define the basis for the drawing in the initial stage in the above manner; line segments that have not been converted yet to 3D data may be sequentially input to sketch a 3D graphics using these 2D line segments and afterwards specified three-dimensionally by converting those to 3D data based on their relationships to line segments that later acquire information in the depth direction.

In this example, by determining the plane that contains the line segment 101 in the above manner, the line segment 101 shown in FIG. 7 is given two kinds of coordinates, i.e., 3D coordinates that are produced according to reverse projection conversion by the reverse projection conversion circuit 13, and 2D coordinates on the 2D screen 2a in the visual field that are set by the visual field input device 8.

Figure 8:
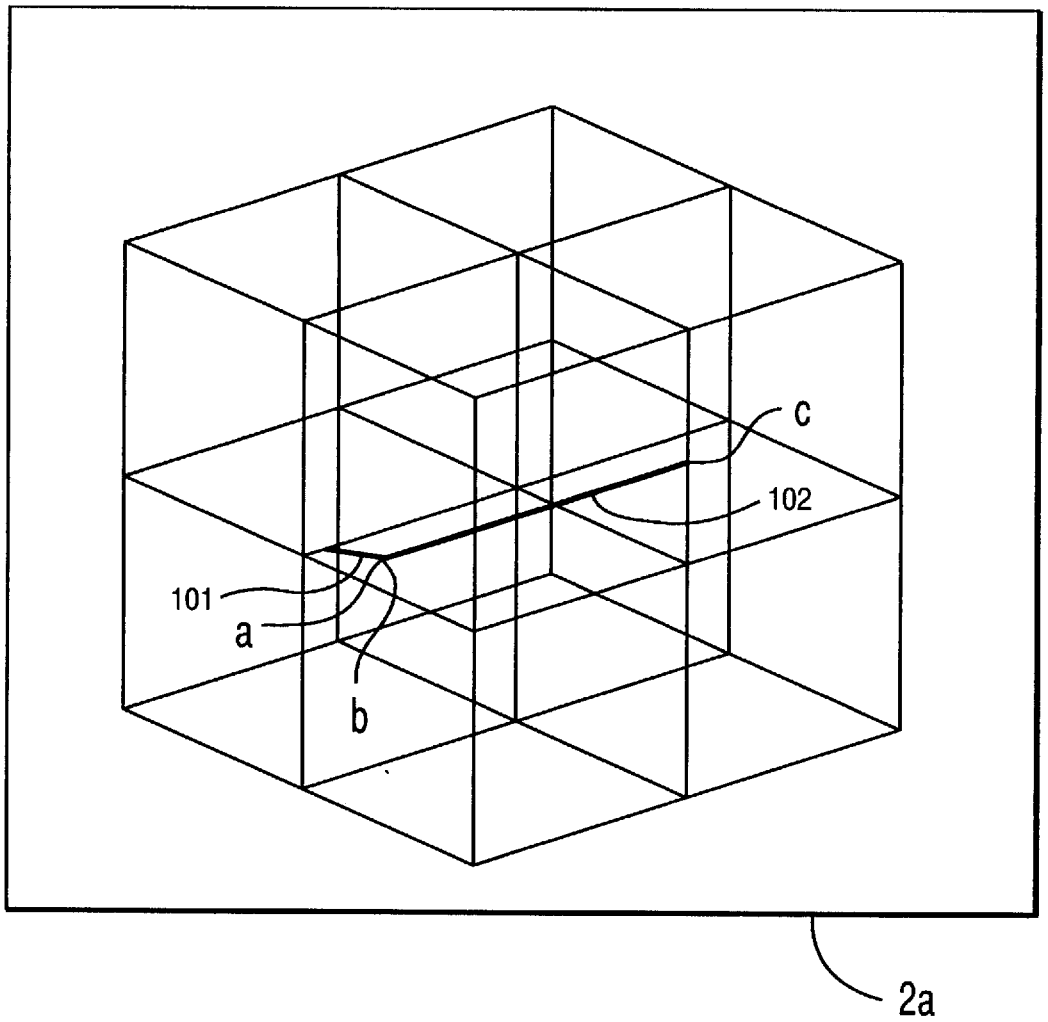

Then, as shown in FIG. 8, a line segment 102 representing the left-side edge of the airplane is drawn onto the 2D projection plane parallel to the line segment that is a projection of the Z-axis. If, on the 2D display screen 2a, the endpoint b of the line segment 102 is drawn close enough to the endpoint a of the line segment 101 that their distance is within the threshold value, the two endpoints are regarded as the same point. Therefore, as described above, the 3D position of the line segment 102 that is parallel to the coordinate axis and extends from the point a, whose position has been determined three-dimensionally, the 3D coordinates of the other endpoint c of the line segment 102 are also determined.

Figure 9:
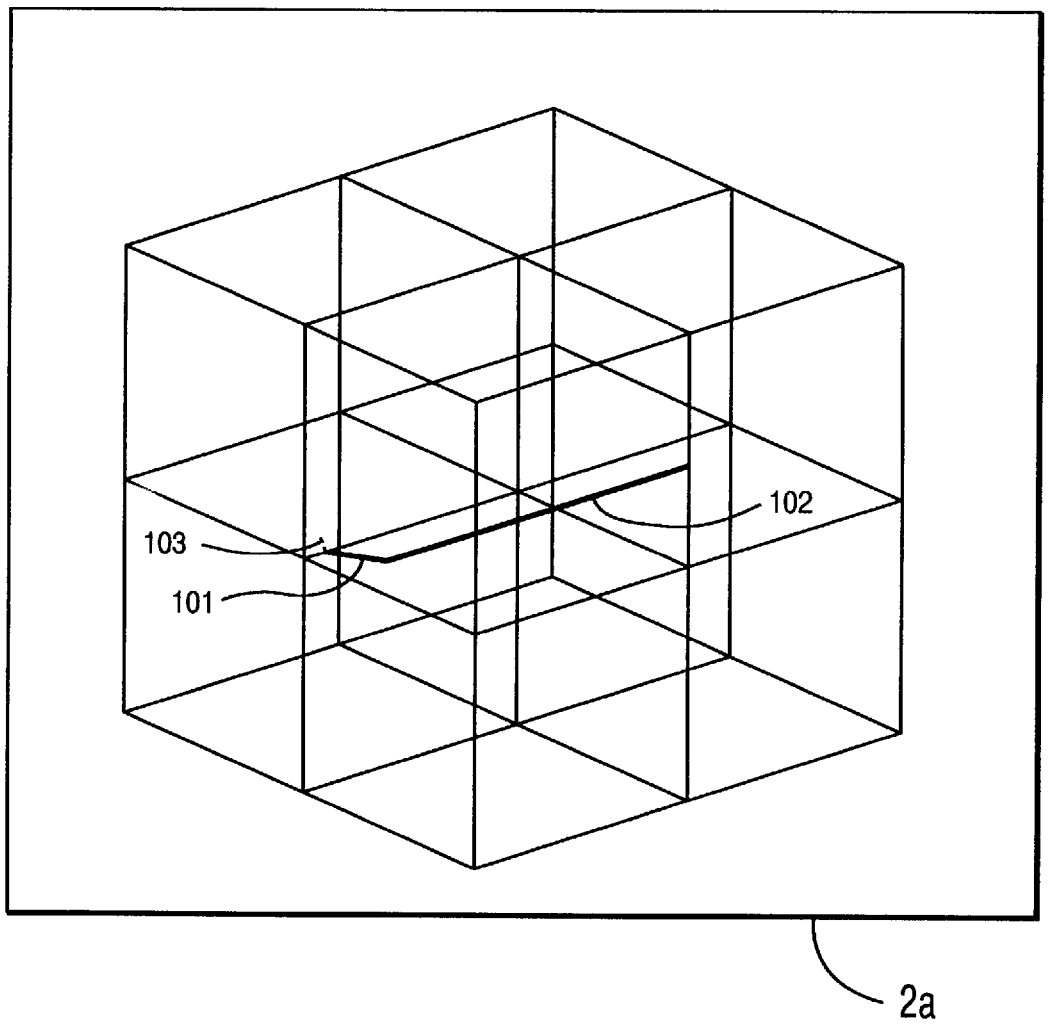

Then, as shown in FIG. 9, a line segment 103 representing the right-side edge of the nose portion is input. While its one endpoint coincides with the endpoint of the line segment 101, the line segment 103 is not parallel to any projected line segment of the coordinate axes, which means that the position of the line segment 103 cannot be determined three-dimensionally. Therefore, the input line segment 103 is just stored temporarily in the 2D data temporary storage device 10 in the form of the original 2D data.

Figure 10:
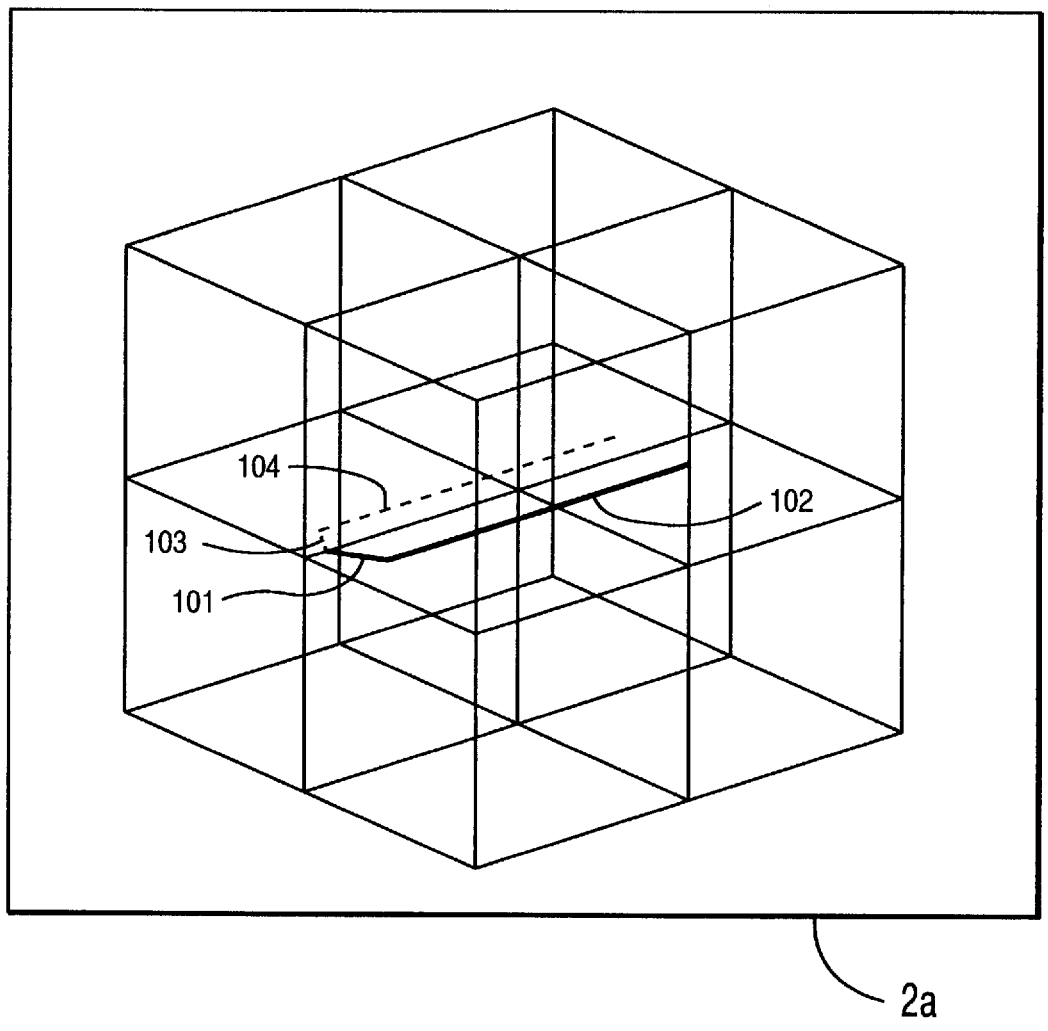

Next, as shown in FIG. 10, a line segment 104 representing the right-side edge of the airplane is input. Since the line segment 104 is drawn so that it is connected to the line segment 103, which has only 2D data, it is not given information in the depth direction. Therefore, being inconvertible to 3D data, the line segment 104 is just stored temporarily.

Figure 11:
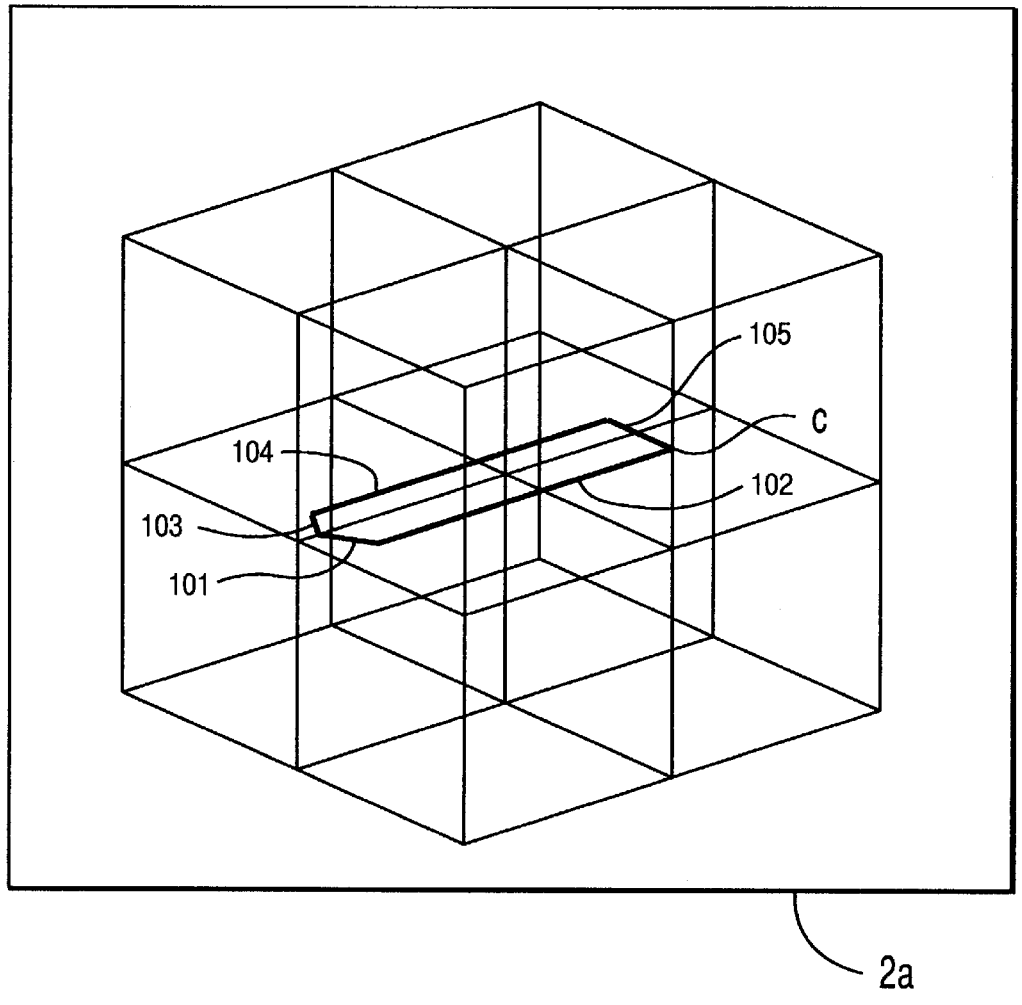

Then, as shown in FIG. 11, a line segment 105 representing the rear end edge of the airplane is input. In this case, one endpoint of the newly added line segment 105 coincides with the endpoint c of the projected line segment 102 having 3D data, and further, the line segment 105 is parallel to the projected line segment of the coordinate axis X. Therefore, as described above, the position of the line segment 105 is determined. When the line segment 105 is given 3D coordinates, the data having only 2D data, that are temporarily stored in the 2D data temporary storage device 10, are reexamined as to whether they are convertible to 3D data. Now that the 3D coordinates of the line segment 105 have been determined, the 3D coordinates of the line segment 104, which is connected to the line segment 105, and further, is parallel to the projected line segment of the Z-axis, are determined. Due to the determination of the 3D coordinates of the line segment 104, the line segment 103 is rendered into a state in which its endpoints coincide with the corresponding endpoints of the line segments 101 and 104, which both have 3D coordinates. Therefore, the 3D coordinates of the two endpoints of the line segment 103 are determined, to give 3D coordinates to the line segment 103.

In this manner, line segments that temporarily have only 2D data can be given 3D coordinates based on the information of a line segment added later. Therefore, the operator need not be aware of the 3D coordinates of line segments every time they are drawn on the display screen 2a using the mouse 1 and, therefore, he can input and construct a 3D graphics as he desires, as if he were sketching it on a paper surface.

Figure 12:
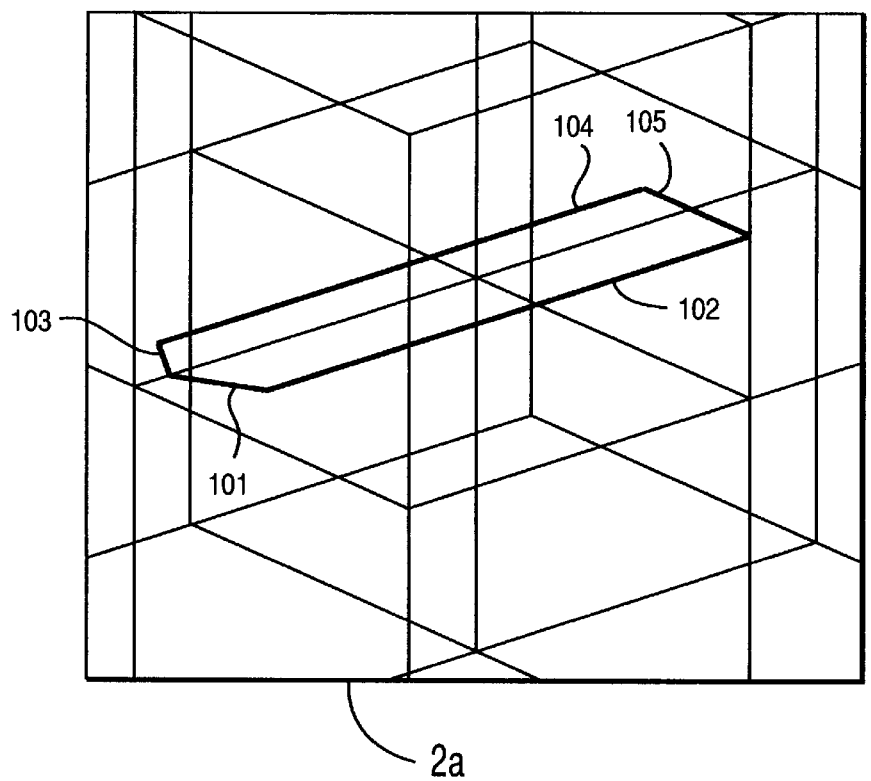
Figure 13:
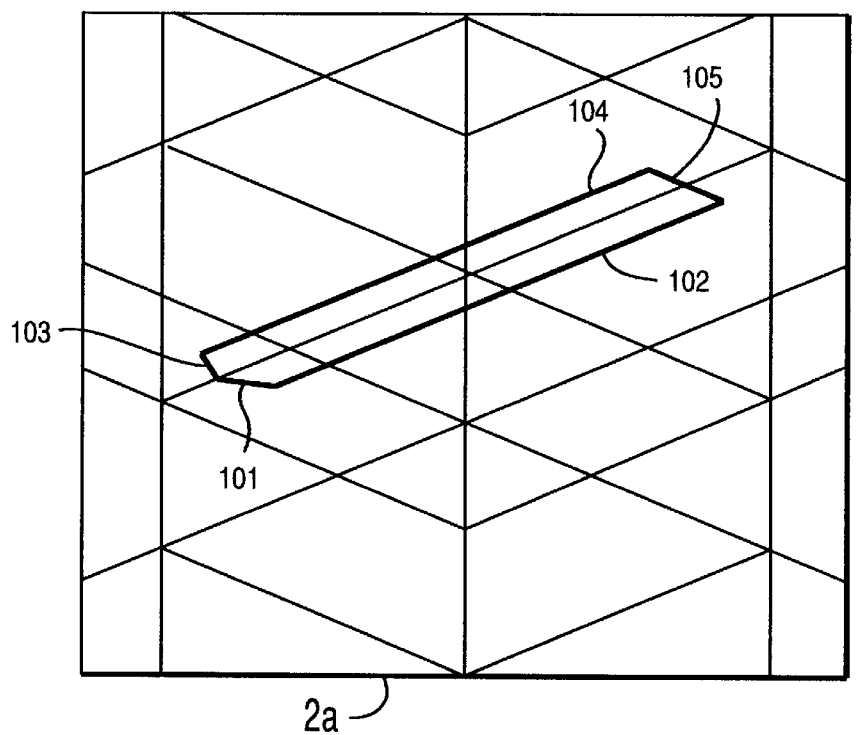

It is possible to enlarge a displayed graphics, as shown in FIG. 12, by performing an enlarging operation on its 3D data on the reference 2D projection plane for parallel projection by changing the parameters provided to the visual field input device 8. It is also possible to rotate a displayed graphics, as shown in FIG. 13, by rotating the reference 2D projection plane, which is also done by changing the parameters provided to the visual field input device 8. With these operations, a display can be realized that can be easily recognized by an operator and can facilitate his drawing. In a similar manner, the reduction, translation, etc. of a displayed graphics can also be performed as desired.

Figure 16:
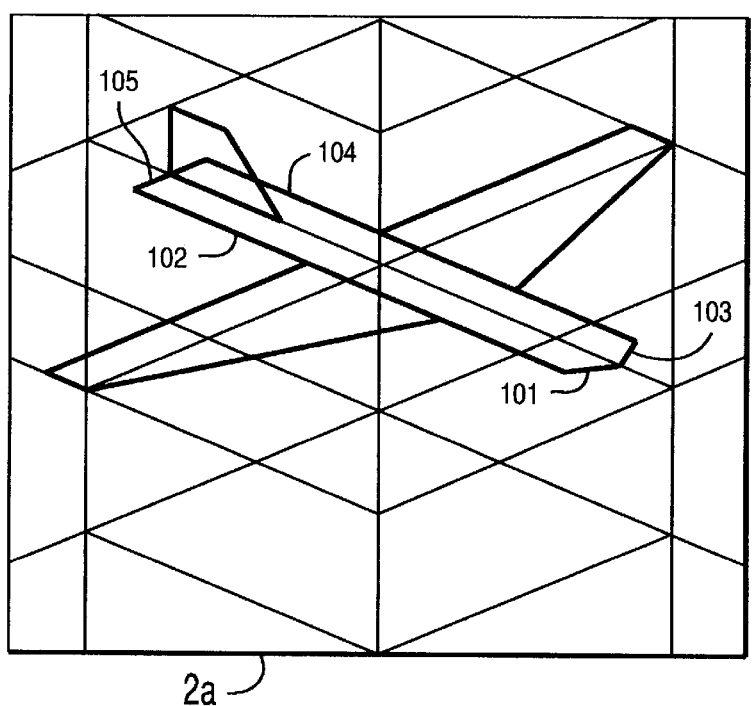
FIGS. 6–16 are schematic diagrams showing display screens.
Figure 14:
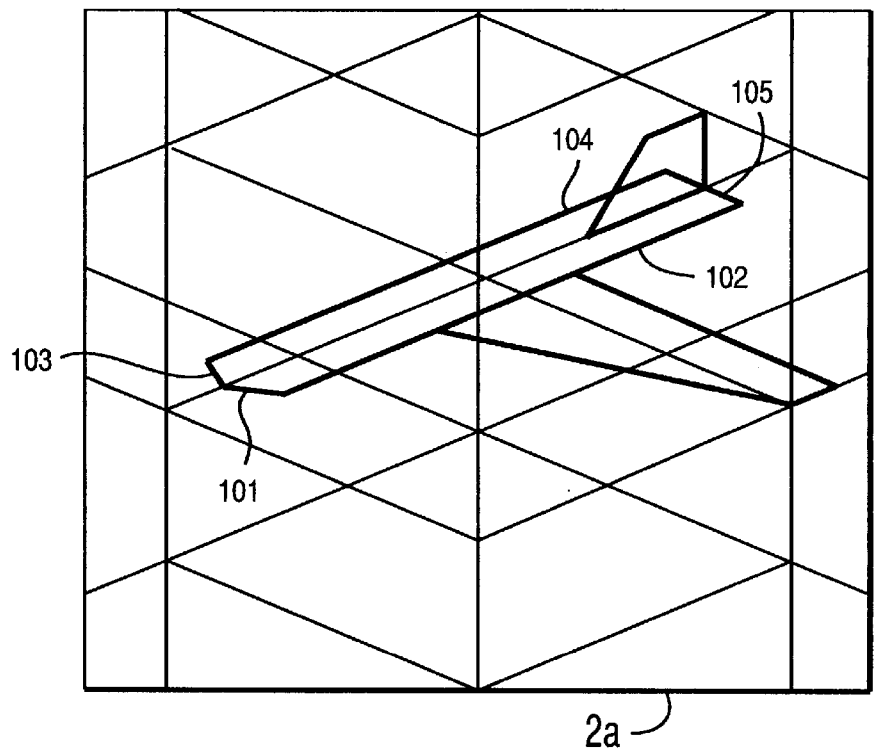
Figure 15:
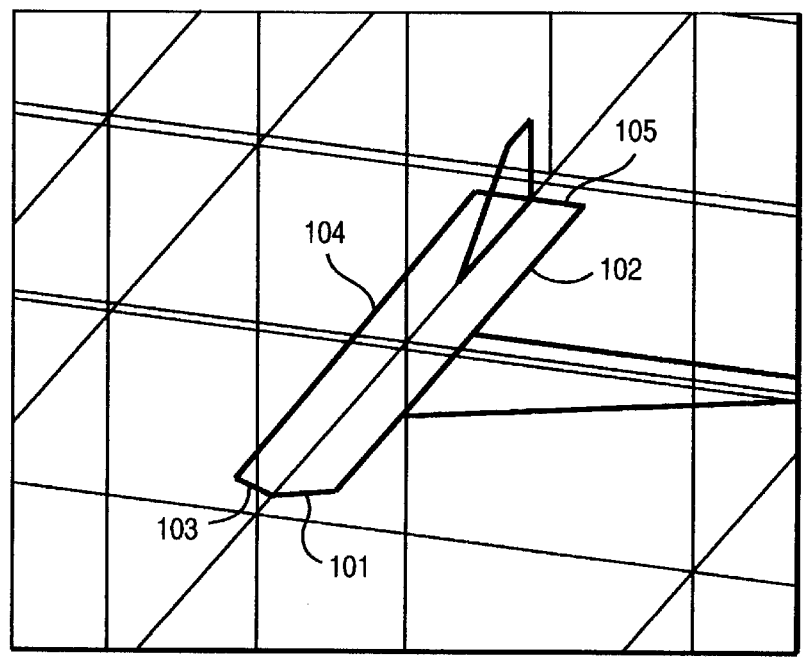
Figure 17A:
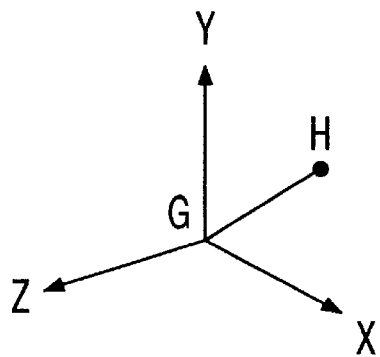
FIGS. 17A–17C are schematic diagrams illustrating states in which 3D line segments are displayed two-dimensionally.
Figure 17B:
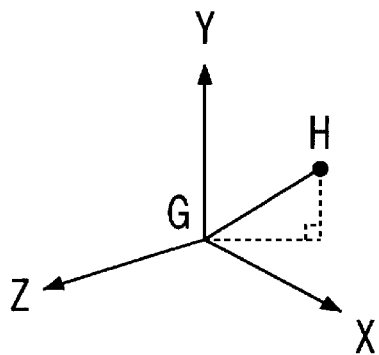
Figure 17C:
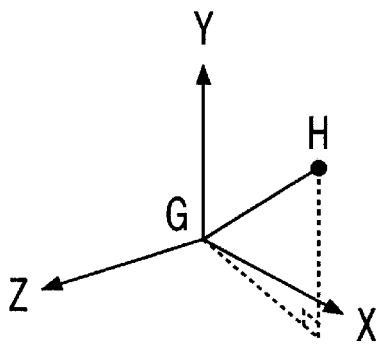

The fuselage portion of the airplane is drawn by the series of operations described above, and then the vertical tail plane and the main wings are drawn as shown in FIG. 14 by performing operations similar to the above. In this case, it is possible to rotate the displayed graphics and move the view point upward, as shown in FIG. 15, by rotating and changing the inclination of the reference 2D projection plane by changing the parameters input from the visual field input device 8, which provides an operator with shape recognition along a variety of directions. The rotation of the displayed graphics can facilitate the drawing of reverse-side portions that are hidden in the original display. For example, the right-side main wing can be drawn more easily in the desired manner by rotating the displayed graphics, as shown in FIG. 16.

According to the apparatus for performing conversion to 3D data as described above, 2D data and 3D data are displayed in a mixed manner and the 2D data can be converted to 3D data when it is later given information in the depth direction, in contrast to the case where every line segment is input while determining its 3D coordinates. Therefore, an operator need not be conscious of the 3D coordinates; he can input a 3D graphics almost as if he were sketching it on a 2D surface.

Although the above embodiment is described for the case of constructing a wireframe graphics consisting only of line segments, a wireframe graphics including line segments that curve in addition to line segments that are line segments of straight lines can also be an object. A line segment is uniquely specified by specifying its two endpoints. In the case of a line segment that curves, in addition to two endpoints, a formula describing the shape of the line segment between the two endpoints can be used as data for specifying the line segment, so that a curve smoothly connecting line segments adjacent to each other can be input.

As an application of the present invention, it is possible that in addition to adding line segments while rotating a graphics, the display screen 2a can be divided into a plurality of screens, i.e., multiple views to concurrently display projection views as viewed from a variety of view points, and arbitrary line segments can be added in a concurrent, parallel manner using the views with which an operator can draw those line segments most easily.

Furthermore, it is possible to draw a graphics such that a 2D rough sketch etc. is saved in advance in a buffer for auxiliary lines, an idea sketch is superimposed on the displayed rough sketch, and the conversion to 3D data is performed afterwards.

Furthermore, line segments can be input to construct not only a polyhedron as the external shape of an object or the ridge lines of, for example, a folded paper graphics, but also to construct the skeleton of a 3D graphics. The invention can further be applied, for example, to the construction of a frame or a rough sketch such as an external shape in the case of drawing a 3D object, and to a 3D arrangement support system.

What is claimed is:

1. A computer program product having a computer readable medium having computer program logic recorded thereon for generating three dimensional data from two dimensional line segments input on a display device displaying two dimensional line segments projected from three dimensional line segment data on a display plane, said computer program product comprising:

computer program product means having computer readable means for receiving two dimensional line segment input, said two dimensional data relative to said display plane;

computer program product means having computer readable means for testing said input line segment for proximity to one or more of said projected line segments, said means for testing including computer program product means having computer readable means for testing for common end points and computer program product means having computer readable means for testing said line segments for a parallel relationships;

computer program product means having computer readable means for converting said input line segment into three dimensional data and storing said three dimensional data if said input line segment is proximate one or more of said projected line segments; and computer program product means having computer readable means for storing said input line segment as two dimensional data if said input line segment is not proximate one or more of said projected line segments.

2. The computer program product of claim 1, wherein said computer program product means for converting, converts said two dimensional line segments into three dimensional data by reverse projection based on said proximate line segments having three dimensional data.

* * * * *